June 9, 1959 G. W. JONSON 2,889,738
MOTION PICTURE CAMERA FINDER AND FOOTAGE INDICATOR
Filed June 18, 1956 2 Sheets-Sheet 1
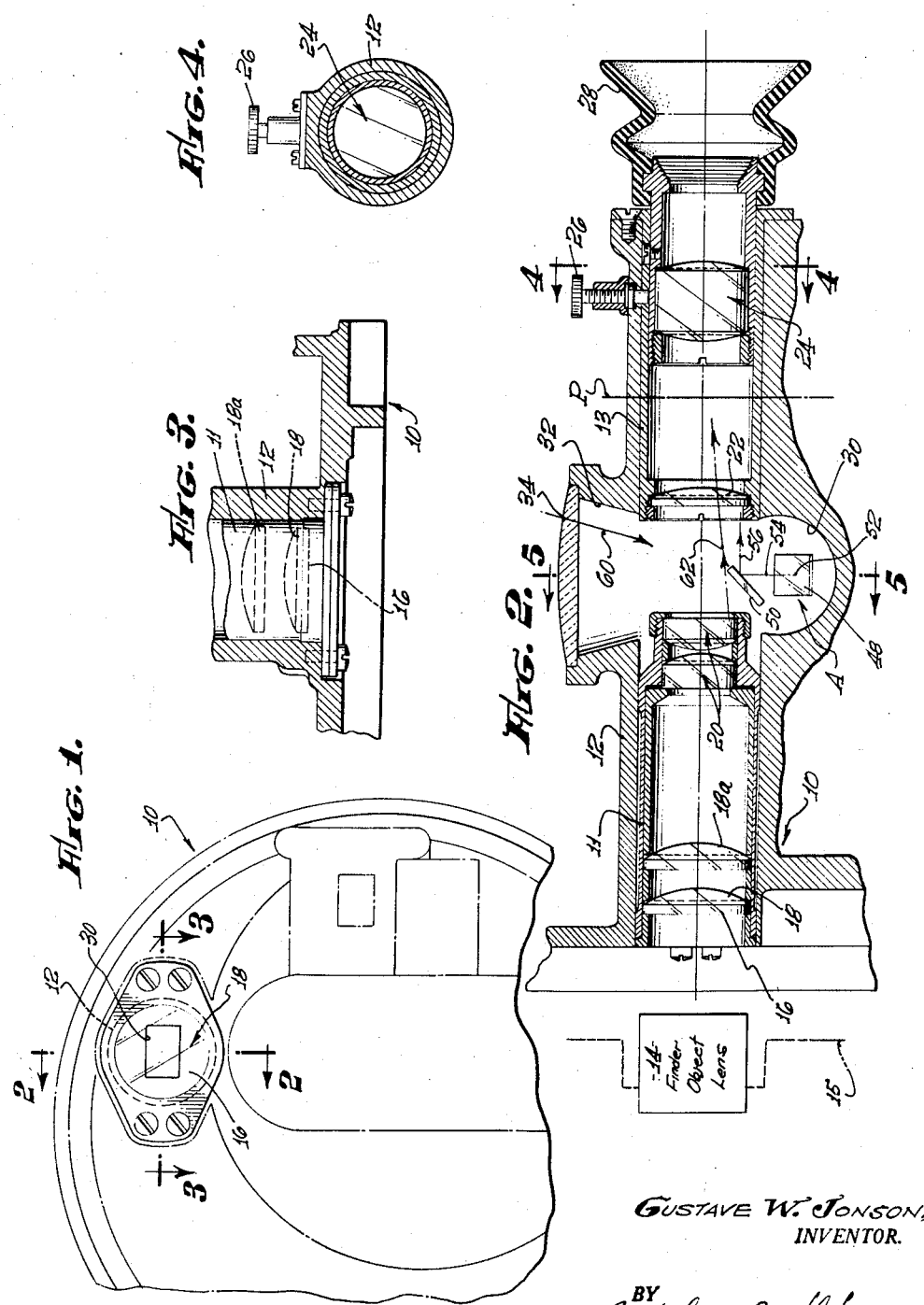
GUSTAVE W. JONSON,
INVENTOR.

June 9, 1959
G. W. JONSON
2,889,738
MOTION PICTURE CAMERA FINDER AND FOOTAGE INDICATOR
Filed June 18, 1956
2 Sheets-Sheet 2
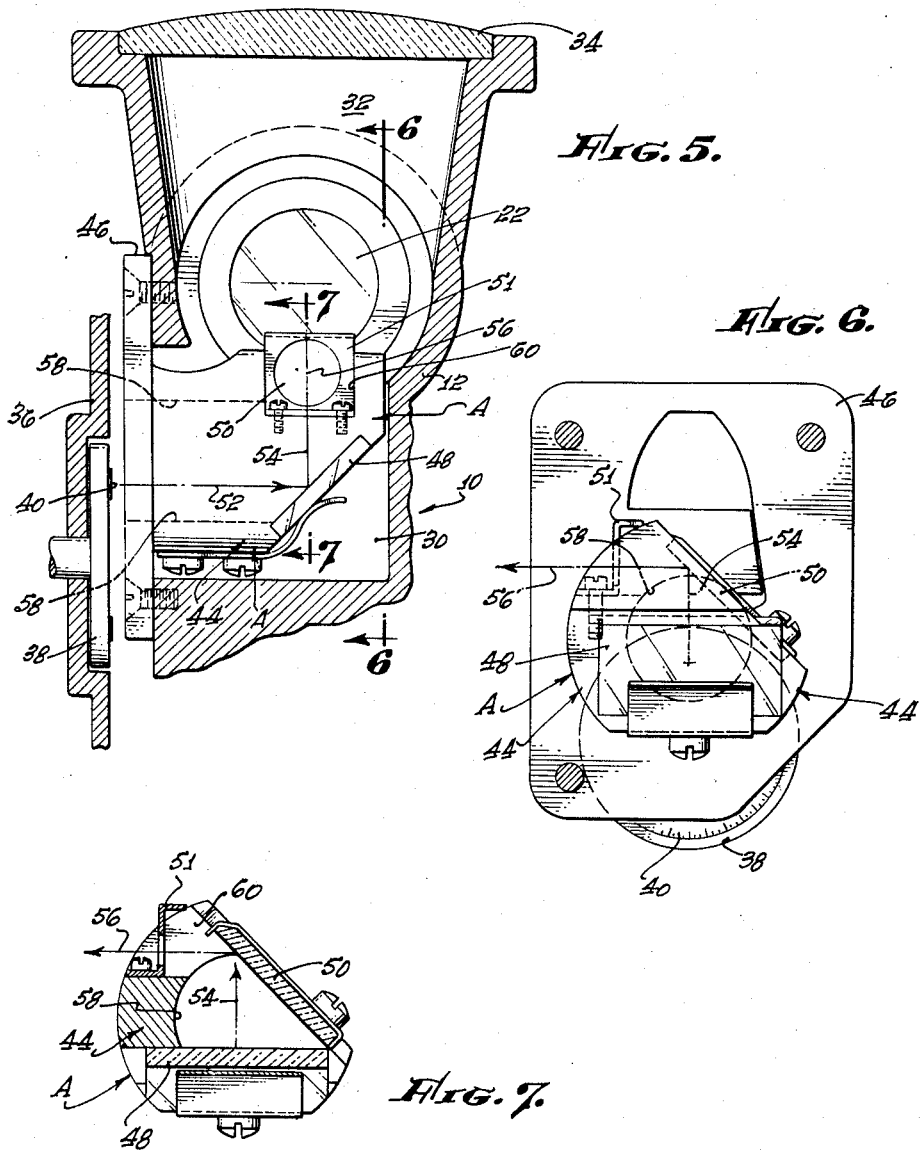
GUSTAVE W. JONSON,
INVENTOR.
BY
ATTORNEYS.

United States Patent Office 2,889,738
Patented June 9, 1959

2,889,738

MOTION PICTURE CAMERA FINDER AND FOOTAGE INDICATOR

Gustave W. Jonson, North Hollywood, Calif., assignor to Mitchell Camera Corporation, Glendale, Calif., a corporation of Delaware Application June 18, 1956, Serial No. 591,876

3 Claims. (Cl. 88—16)

This invention has to do with motion picture cameras, and its general object is to provide means for giving the camera man a constant view of the film footage indicator as he looks in the finder.

According to the invention, that is done by providing an optical system in combination with the optical system of the finder whereby an image of the counter indicator is thrown into the field of the finder ocular. And that is done, as will be described in a preferred arrangement, without interfering with or obstructing the view of the picture field.

A preferred design, illustrative of the invention, is described in the following description and illustrated in the accompanying drawings, where:

Fig. 1 is a fragmentary front view of a camera body, showing the front end of the finder;

Fig. 2 is a longitudinal vertical section on line 2—2 of Fig. 1, showing certain parts schematically;

Fig. 3 is a detail section on line 3—3 of Fig. 1;

Fig. 4 is a section on line 4—4 of Fig. 2;

Fig. 5 is an enlarged section on line 5—5 of Fig. 2;

Fig. 6 is a side elevation, taken as indicated by line 6—6 on Fig. 5 of the optical unit A of Fig. 5, omitting the body parts shown in Fig. 5; and Fig. 7 is a detail section on line 7—7 of Fig. 5.

In Figs. 1–4 typical optics and mounting of a finder on a camera body 10 are shown. The finder mounting tube 12, integral with the body, carries the finder optics with the exception of the finder objective 14 which is carried by the camera lens turret carried on the body and indicated at 15. The objective throws its image of the field on a ground glass, or on the front plane ground face 16 of a front collective 18, two of which are shown here, the rear one designated 18a. The lens 20, here shown as compound, picks up the image on ground surface 16 and, aided by a collective 22, casts its image onto an image plane such as that indicated by the broken line P, in front of ocular 24. The ocular is shiftable, as by the adjusting thumb nut 26, to sharply focus the image at P for the observers eye at the eye-cup 28.

A rectangular outline 30 is marked on the ground surface 16, delineating, in the finder field, the field frame image that falls on the motion picture film in the exposure aperture behind the photographic objective, also carried by the lens turret. That is, the part of the finder image that lies within outline 30 corresponds to the photographic image on a frame of the film in the photographing aperture.

At a point between lenses of the finder optical system, and preferably removed from any focal plane, an opening or gap is made in the tube structure 12. For example, between the lens 20 and collective 22 an opening 30, 32 is made in the body 10 and tube 12. The upper, otherwise open, end of this opening is fitted with a transparency 34. The lower part 30 of the opening extends transversely of the length of the finder tube to the exterior of the body (see Fig. 5). In this particular design, the film magazine is mounted on or close to that exterior body wall, the magazine wall being shown in Fig. 5 at 36. In that wall the footage counter indicator is shown as a disk 38, with footage indications indicated at 40 opposite the open end of the opening part 30.

To effectuate the open space between lenses 20 and 22, to allow for the interposition of the element A between those lenses, the optics of the finder system are mounted in two separate tubes 11 and 13 mounted fixedly in mounting tube 12. The optical elements 18, 18a and 20 are mounted in forward tube 11; and elements 22 and 24 are mounted in rearward tube 13.

The optical unit A has an apertured body 44 that fits into the opening part 30, and has a flange 46 attached to the outer face of the body as shown in Fig. 5. Optical unit A carries two reflector elements 48 and 50. Light from footage indication 40 travels through opening 58 on the horizontal path indicated at 52 in Figs. 5 and 2 and, falling on reflector 48, is reflected upwardly along the path 54 to strike reflector 50 and then be reflected along the horizontal path 56 in a direction longitudinal of the finder axis and toward collective 22 and ocular 24. Light passes along those paths through the apertures 58 and 60 in the body 44 of the optical unit A. In Fig. 5, the reflected light from the footage indication is travelling toward the observer along path 56. A small diaphragm 51, fitted into the opening 60, limits the view of the counter. Fig. 2 schematically shows only the reflectors 48 and 50, for simplicity of illustration. In that figure light is travelling along path 52 from the footage indicator in a direction away from the observer.

The location of reflector 50 is such that its upper part, from which the light beam 56 is reflected, is just above the lower edge of collective 22, so that the beam 56 falls on the lower part of that lens as indicated in Fig. 2. The focal length of collective 22 is such that it focuses an image of indication 40 at the focal plane P where the image of the finder view is also focussed; both images then being viewed through ocular 24. The diaphragm at 51 limits the view of the footage indicator.

Light to illuminate the footage indication 40 is admitted through transparency 34; reflected to the indication by the reflector 48. To concentrate light from 34 on the indication, that element may be in the form of a convex lens. To prevent the light admitted at 34 from fogging the view in the ocular, the whole interior of optical unit body 44 and the opening 30, 32 in the main body may be blacked. The footage indicator may also be seen through transparency 34 by looking down in the direction indicated in Fig. 2 by arrow 60, past the upper edge of reflector 50 onto reflector 48. Reflector 50 is in such a position over reflector 48 that it does not obscure the view of 48 from above.

Due to the fact that reflector 50 is located out of all focal planes of the finder optical system, it does not blank off any part of the normal field of view of that system, even if it projects somewhat into the image-forming light beam.

The whole finder field, as seen through the finder, is considerably larger than the frame area delineated at 30, so that the camera man, as he swings the camera around, may see what is coming into the frame area. Collective 22, as shown here, is larger than lens 20. Consequently, reflector 50 can be, and is shown here, located so as to reflect the beam 56 onto the lower part of 22, and at the same time be quite or completely outside the convergent image-forming beam from lens 20. This is illustrated in Fig. 2 by the relation of 50 to the ray indicated at 62, illustrative of an outermost ray in the convergent light beam. In such a position reflector 50 does not cut off any image-forming light. But even if it, or the diaphragm 51, does project upwardly somewhat into the image forming beam, it merely cuts off a small fraction of the finder light beam; it does not blank out any portion of the field image viewed in the ocular.

I claim:

1. In a motion picture camera having a body, a visual film footage indicator mounted on the body, and a view finder mounted on the body, said view finder comprising an optical system having an objective, a translucent surface on which the objective focusses a real image, an image forming lens which picks up said real image and forms a second image thereof, a collective lens in the image forming beam of the image forming lens and spaced therefrom, said image forming and collective lenses focussing said second image at a predetermined focal plane, and an ocular for viewing said second image; the combination of an optical system introducing a light beam from the footage indicator into the optical system of the finder at a point between the said image forming lens and said collective, said introduction system including a reflector element located between the two last named lenses and directing said beam toward said collective along a line parallel to the optical axis of the finder optical system; the effective focal length of said collective being such as to focus an image of the footage indicator at said focal plane of the finder.

2. The combination defined in claim 1 and in which the camera body has an open space extending laterally across the optical axis of the finder optical system and through which open space the footage indicator is visible, said optical system for introducing a light beam from the footage indicator being located in said open space.

3. The combination defined in claim 2 and in which said open space is externally open for admission of light to illuminate the footage indicator.

References Cited in the file of this patent

UNITED STATES PATENTS

| | | |
|---|---|---|
| 2,249,975 | Nissen | July 22, 1941 |
| 2,585,451 | Frankel | Feb. 12, 1952 |

FOREIGN PATENTS

| | | |
|---|---|---|
| 1,076,024 | France | Apr. 14, 1954 |